United States Patent [19]

Kunz

[11] Patent Number: 4,938,300

[45] Date of Patent: Jul. 3, 1990

[54] WEIGHING APPARATUS HAVING MULTI-RANGE MOTION TRANSMITTING LEVERS

[75] Inventor: Peter Kunz, Gossau, Switzerland

[73] Assignee: Mettler Instrumente AG, Greifensee, Switzerland

[21] Appl. No.: 426,167

[22] Filed: Oct. 25, 1989

[30] Foreign Application Priority Data

Nov. 15, 1988 [CH] Switzerland .............................. 4238

[51] Int. Cl.$^5$ ...................... G01G 23/14; G01G 7/00; G01G 21/08

[52] U.S. Cl. .................................... 177/164; 177/212; 177/256

[58] Field of Search ............... 177/164, 172, 212, 251, 177/256

[56] References Cited

U.S. PATENT DOCUMENTS

| | | | |
|---|---|---|---|
| 3,299,977 | 1/1967 | Melendy | 177/251 X |
| 4,184,556 | 1/1980 | Kunz | |
| 4,184,557 | 1/1980 | Kunz | |
| 4,711,314 | 12/1987 | Suzuki et al. | 177/164 |
| 4,722,409 | 2/1988 | Kunz | |
| 4,778,016 | 10/1988 | Uchimura et al. | 177/164 |

Primary Examiner—George H. Miller, Jr.
Attorney, Agent, or Firm—Laubscher, Presta & Laubscher

[57] ABSTRACT

A weighing apparatus comprising a first self-contained weighing device (1) including a first farme (2), a first load-receiving member (5) connected by a parallel guide arrangement for movement from a normal no-load position relative to the first frame, a load-responsive device (10) for indicating the magnitude of an applied load as a function of the movement of the first load receiving member, and a first motion-transmitting lever (7) connected between the first load receiving member and the position-responsive device, characterized by the provision of a second load receiving member (16,28) to which the load to be measured is applied, and a second pivotally mounted motion-transmitting lever (17,30) connecting the second load receiving member, thereby to provide a resultant load range that is higher than that of the first weighing device. Thus, various increased load ranges may be achieved starting from a standard self-contained weighing apparatus. Moreover, a calibration weight (23) may be applied to the first load receiving member at a position other than that at which the load to be weighed is applied.

11 Claims, 2 Drawing Sheets

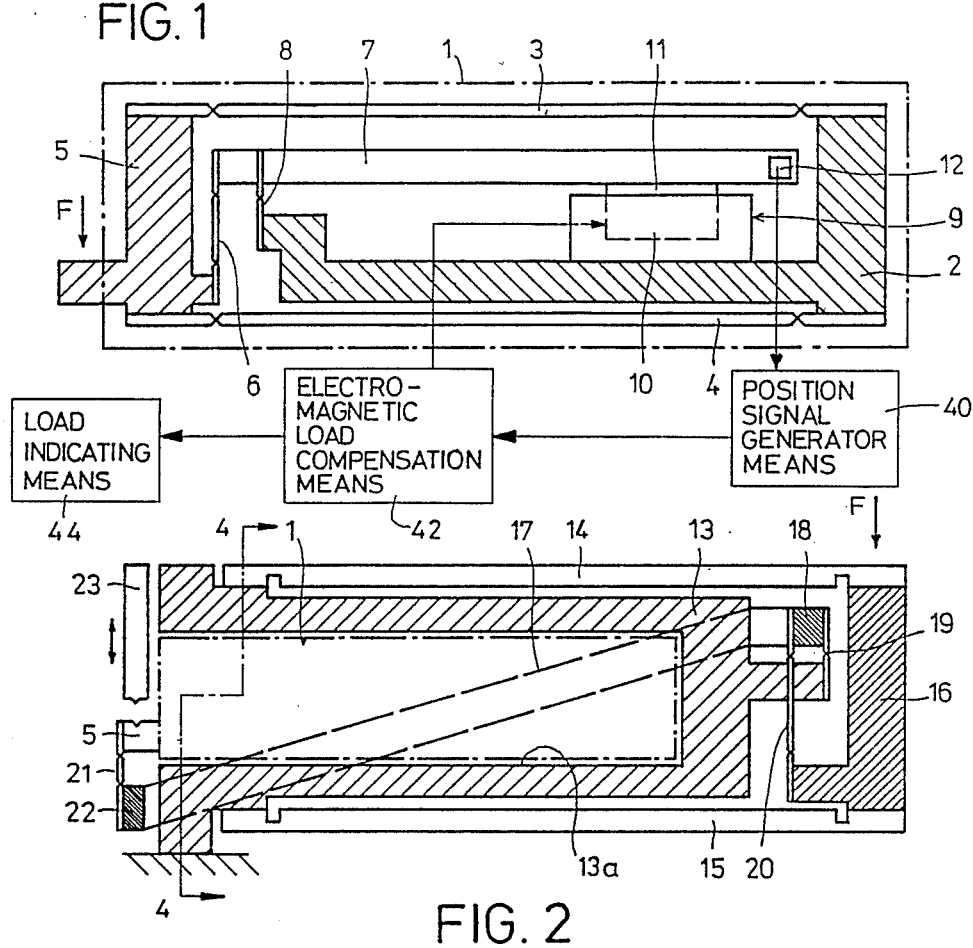
FIG. 1
FIG. 2
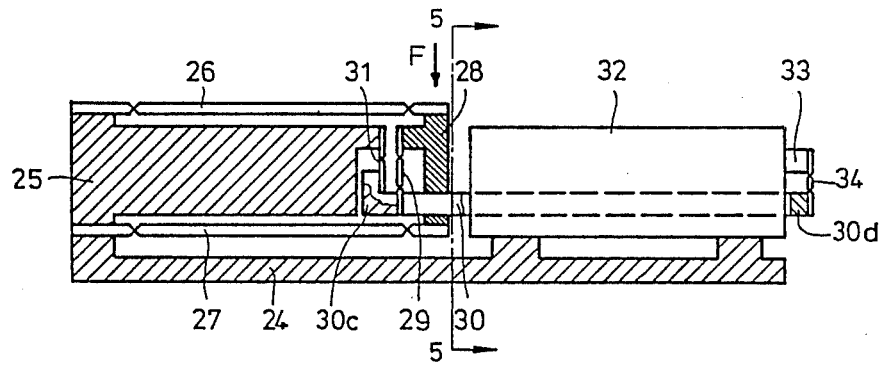
FIG. 3

WEIGHING APPARATUS HAVING MULTI-RANGE MOTION TRANSMITTING LEVERS

BRIEF DESCRIPTION OF THE PRIOR ART

This invention relates to weighing apparatus including multiple motion-transmitting levers for increasing the weighing range of a standard weighing apparatus having a first load receiving member connected by parallel spaced resilient guide means for movement relative to a frame upon which a weighing cell is mounted. The invention is applicable to weighing systems of a type including a strain gauge means, oscillating string means, or electromagnetic load compensation means. A scale having electromagnetic load compensation and double lever transmission is disclosed in the inventor's prior U.S. Pat. No. 4,184,556 (German Off. No. 2,844,336). Also the inventor's prior patent Nos. 4,184,557 and 4,722,409 disclose weighing systems including parallel guide means for guiding a load receiving member relative to a stationary frame, and systems provided with electromagnetic load compensation, respectively.

Electromechanical weighing apparatus of this type are made in various mechanical models, using a standard weighing cell that is mass-produced and that is equipped with a corresponding number of transmission levers, depending upon the rated load. As a rule, only the weighing cell can be made in large numbers of units in such a program, while, for the mechanical part of the scale, mostly different designs are used depending on the rated load of the scale, thereby leading to smaller numbers of units during mass production.

Another difficulty arises in scales to which a calibration weight is to be connected. In order that the size of the calibration weight might be kept within certain limits relative to the overall size of a higher-load scale, the point of application of the calibration weight to the scale is preferably at the place of the transmission of force between two transmission levers—i.e. at the place of attachment at the transmission lever that directly acts upon the weighing cell. Effect of the calibration weight on the weighing cell, in such a direct coupling of the weight to a transmission lever, depends on the position of the connected calibration weight relative to the longitudinal extent of the transmission lever. In order to obtain reliable calibration at all times, the length of the lever arm upon which the calibration weight takes effect must remain constant for a long time. This prerequisite, however, is met only if the connecting mechanism is manufactured with utmost precision. Even a minimal shift in the guidance of the calibration weight with respect to the placement point can, after repeated connection, lead to a shift of the placement point, and thus to a change in the length of the lever arm, the length change having a disturbing effect especially in high resolution scales.

A common solution of these problems can be provided, in accordance with the present invention, by associating a parallel-guided load receiver with the motion-transmitting lever that acts directly upon the weighing cell.

With a view to the mass production of scales, the invention affords an improved scale concept which, in accordance with a preferred embodiment of the invention, consist of the fact that the transmission lever cooperating with the weighing cell and the load receiver associated with the latter are combined into one basic structural unit with the weighing cell, thereby representing an independent scale of low-weighted load which may be inserted into the remaining mechanical part of the scale to produce a higher rated load. Thus, the basic or standard weighing apparatus can, within a given model series, represent the scale with the lowest rated load, and can be used in all higher load scales of the model series. This involves a more comprehensive structural unit than has been previously represented by the weighing cell alone. Mass production can, therefore, be extended to a larger material area than has been the case until now.

Furthermore, the coupling of the basic or standard unit which comprises the weighing cell to the series-connected motion-transmitting lever is not critical, because the correct force transmission does not depend on the position of the coupling point on the load receiver in the base unit. The assembly of the scale is thus much simpler, and under certain circumstances, the basic unit can even be made as a slide-in unit, thereby simplifying the assembly of the scale.

SUMMARY OF THE INVENTION

Accordingly, a primary object of the present invention is to provide an improved weighing apparatus in which the load weighing range of a standard first weighing apparatus is increased by the use of additional or supplementary motion transmitting lever means as an attachment for the first weighing apparatus. More particularly, the first weighing apparatus includes a first frame, a first load-receiving support member connected with the first frame by parallel guide means, and a first motion-transmitting lever pivotally connected with the frame for transmitting the motion of the first load receiving member to a weighing cell device mounted on the first frame. This first weighing means—which has a given load-receiving range—is then mounted on a second frame to which a second load-receiving member is connected by parallel resilient guide means, a second transmitting lever serving to connect the second load-receiving member with the first load receiving member. In one embodiment the first weighing means comprises a self-contained unit adapted for sliding insertion within a lateral opening contained in the second frame. In another embodiment, the first weighing means is supported on a platform portion of the second frame. Thus, for example, by the use of an appropriate assembly of scale units, a basic or standard unit having a rated load of 0.1 kg can be used with three supplementary units to provide additional rated loads of 1 kg, 20 kg and 600 kg, respectively. The 1-kg unit is produced by a basic 0.10 kg scale with a first supplementary unit, the 20 kg scale is produced by a 1 kg scale with a second supplementary unit, and the 600 kg scale results from a 20 kg scale with a third supplementary unit. The 0.1 kg scale as well as the first and second supplementary units can be made as slide-in units which means that, during the assembly of the various units, each time no adjusting work will be needed; only the coupling members will have to be attached. On the basis of this building block principle, one can make scale production more flexible and economical. Besides, on the basis of this concept, using a high-resolution weighing cell which may preferably work according to the principle of electromagnetic force compensation, plus using precisely working, durable transmission members, one can make high-resolution, broad-band scales having a high load rating.

In a scale with a connectable calibration weight, the application point for the calibration weight is preferably on a load receiver, especially on the load receiver for the transmission lever that cooperates with the weighing cell. In this manner one can make sure that—in the same manner as in the load receiver for the weighing material—it is possible to apply the force into the transmission lever coupled to the load receiver independently of the position of the deposited weight. Any length changes with relation to the lever arm on which the calibration weight acts will thus not influence the calibration. Furthermore, the requirements for the accuracy of the connecting mechanism will be less high.

As a result of the installation of one or more additional parallel guided load receivers, one fundamentally gets somewhat larger dimensions for the scale. At any rate, one can take into account the general air of having a lower structural height, e.g. by seeing to it that the structural components are arranged next to each other in the flat arrangement pattern. This solution can be used advantageously especially in high-weight scales whose horizontal extent is relatively large anyway because a lower structural height of such scales makes the loading of and especially the driving onto such scales easier.

BRIEF DESCRIPTION OF THE DRAWINGS

Other objects and advantages of the invention will become apparent from a study of the following specification when viewed in the light of the accompanying drawings, in which:

FIG. 1 is a somewhat diagrammatic sectional view of a self-contained first weighing apparatus;

FIG. 2 is a somewhat diagrammatic sectional view of a first embodiment of the invention in which the self-contained weighing apparatus of FIG. 1 is mounted within the frame which supports the second load receiving member;

FIG. 3 is a generally diagrammatic sectional view illustrating a second embodiment of the invention;

DETAILED DESCRIPTION

Figure 4:
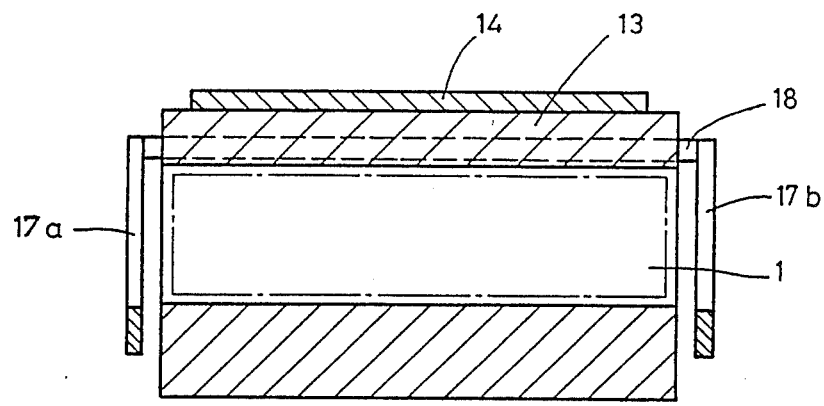
FIG. 4 is a sectional view taken along the line 4—4 of FIG. 2.

Referring first and more particularly to FIG. 1, the weighing apparatus of the present invention includes a self-contained first weighing system 1 having a housing and including a rigid frame 2 to which a first load receiving member 5 is connected for vertical movement by parallel spaced upper and lower resilient guide members 3 and 4, respectively, as is known in the art. Pivotally supported intermediate its ends from the rigid frame 2 by flexible bearing means 8 is a motion-transmitting lever 7, one end of which is connected with the first load receiving member 5 by a flexible bearing 6. At its other end, the lever 7 is associated with a position measuring device 12 (for example, a photoelectric cell) that supplies an input to position signal generator means 40. In the illustrated embodiment, the weighing apparatus is of the known electromagnetic load compensation type including stationary permanent magnet means 10 connected with the frame 2, and a movable coil member 11 connected with the motion-transmitting lever 7. Thus, as known in the art the position signal generating means controls the operation of electromagnetic load compensation means 42 for supplying compensating current to the coil 11, thereby to maintain the load receiving member 5 in its initial no-load position, the magnitude of the compensating current being a measure of the magnitude of the applied load, as indicated on the load indicating means 44. The self-contained weighing apparatus of FIG. 1 has a given load rating which is, among others, a function of the length of the motion transmitting lever 7.

The weighing apparatus of FIG. 1 is suitable for use as an independent scale having a low load rating and higher resolution, and is known in the art. In higher-resolution scales with multiple lever transmission means, however, there has not, as yet, been provided a parallel-guided load receiver 5 that is associated with a transmission lever 7 which cooperates with a weighing cell 9; such a receiver has not been considered necessary. On the contrary, in such scales the additional leverage is directly coupled with the transmission lever 7 which operates on the weighing cell 9, as shown, for example, in FIG. 4 of the U.S. Pat. No. 4,184,557 wherein an electromagnetic scale includes double transmission lever means.

Referring now to FIGS. 2 and 4, in accordance with the present invention, there is provided a second rigid frame member 13 containing a lateral opening 13a that receives the weighing apparatus 1 of FIG. 1, as shown in phantom. At one end of the frame 13, the first load receiving means 5 extends outwardly from one end of the housing 1. At the other end of the frame 13, there is provided a second load receiving member 16 which is connected for vertical guided movement relative to the second frame 13 by resilient upper and lower guide members 14 and 15, respectively. Pivotally connected at one end with the second frame 13 by flexible support bearings 19 is a second motion-transmitting lever 17 that is bifurcated to define a pair of arm portions 17a and 17b, and a pair of transverse end portions 18 and 22. The second motion-transmitting lever 17 is connected at its other end with the first load receiving member 5 by flexible bearing 21 that is connected with the transverse portion 22 of the second lever 17. The second load receiving member 16 is suspended from an intermediate portion of the lever 17 by flexible suspension bearing means 20. Thus, in the embodiment of FIG. 2, the first weighing means 1 is slidably received within the lateral opening 13a of the second frame means 13, whereby owing to the presence of the motion transmitting lever 17, the resultant combined instrument has a higher load rating for receiving the load F applied to the second load receiving member 16, than the first weighing means 1 of FIG. 1 alone. According to an important advantage of the invention of FIG. 2, a calibrating weight 23 may be applied directly to the first load receiving member 5 independently of the second load receiving member 16 that actually receives the load to be measured F.

Figure 5:
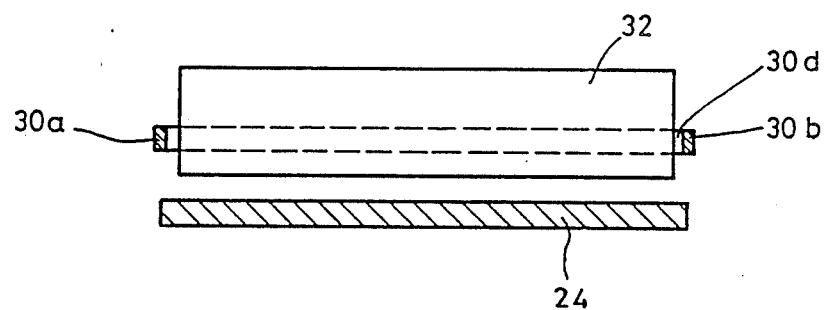
FIG. 5 is a sectional view taken along the line 5—5 in FIG. 3.

Referring now to the embodiment of FIGS. 3 and 5, the first weighing apparatus 32 is provided with a first load receiving member 33 that projects from one end of the associated housing. In this embodiment, the second load receiving means 28 is connected for vertical movement relative to the frame 25 by parallel spaced upper and lower resilient guide members 26 and 27, respectively, the frame being provided with a horizontal base portion 24 that supports the self-contained first weighing apparatus 32 in a position in alignment with the guide members 26 and 27, and on the opposite side of frame 25 from the second load receiving member 28. In this embodiment, the second motion-transmitting lever 30 is suspended at one end by flexible bearing means 31 from the second frame 25, and at its other end the second motion-transmitting lever 30 is connected with the first load receiving member 33 by the flexible bearing means 34. Intermediate its ends, the motion-transmitting lever 30 is connected with the second load-receiving member 28 by flexible bearing means 29. The second motion-transmitting lever means 30 is bifurcated to define a pair of arm portions 30a and 30b that are arranged on opposite sides of the first weighing apparatus 32, the transverse end portions 30c and 30d being associated with the suspension bearing means 31 and 34, respectively. In this embodiment, as in the embodiment of FIG. 2, the combined multi-lever weighing apparatus has a higher load rating for the application of loads F to the second load receiving member 28 than that of the first weighing means 32, owing to the presence of the motion transmitting lever 30.

What is claimed is:

1. Weighing apparatus of the electromechanical type comprising:
    (a) first weighing means (1,32) including:
        (1) a first frame (2);
        (2) first load receiving means (5,33) connected with said frame by parallel guide means (3,4) for movement relative to said frame;
        (3) load-responsive means (9) connected with said frame for determining the magnitude of the applied load; and
        (4) first motion-transmission lever means (7) pivotally connected with said frame for transmitting to said load-responsive means movement of said load receiving means relative to said frame;
    (b) second load receiving means (16,28) connected by parallel guide means (14,15; 26,27) for movement relative to a frame upon the application thereto of a load to be measured; and
    (c) second motion-transmitting lever means (17,30) for transmitting movement of said second load receiving means to said first load receiving means.

2. Apparatus as defined in claim 1 wherein said first weighing means comprises a self-contained unit (1,32) in which said first frame, said first transmission lever and said load-responsive means are mounted, said load receiving means being arranged adjacent one end of said unit;
    and further wherein said second load receiver means includes:
        (1) a second frame (13,24) rigidly supporting said first frame; and
        (2) means (19,31) connecting said second motion-transmitting lever means for pivotal movement relative to said second frame, said second motion-transmitting lever means affording an additional load ratio to that of said first lever means, thereby to provide a resultant scale having a higher load rating than said first weighing means.

3. Apparatus as defined in claim 2, wherein said second frame contains means (13a, 24) for supporting said first unit (1,32).

4. Apparatus as defined in claim 3, wherein said support means comprises a lateral opening (13a) contained in said second frame for slidably receiving said first unit (1).

5. Apparatus as defined in claim 4, wherein said first and second load receiver means are arranged adjacent opposite ends of said second frame, said second motion-transmitting lever means being bifurcated to define a pair of arm portions (17a, 17b) extending on opposite sides of said first weighing means, respectively.

6. Apparatus as defined in claim 2, wherein said second frame means includes a base portion (24) supporting said first weighing means at a position in collinear alignment with said second load receiver means, said one end of said unit being remote from said second load receiver means, said second motion-transmitting lever-means being bifurcated to define a pair of arm portions (30a,30b) arranged on opposite sides of said first weighing means.

7. Apparatus as defined in claim 2, wherein said first load receiver means includes a load receiver member (12), and a pair of parallel spaced first guide members (3,4) each connected at one end with said frame and at the other end with said first load receiver member, respectively, said first motion-transmitting lever means and said load responsive means being contained between said first guide members.

8. Apparatus as defined in claim 7, wherein said second load receiving means includes a second load receiving member (16,28), and a pair of parallel guide members (14,15; 26,27) each connected at one end with said second frame and at the other end with said second load receiving member, respectively.

9. Apparatus as defined in claim 8, wherein said first weighing means (1) is arranged between said second guide members, said first and second load receiving members being arranged at opposite ends of said first weighing means, respectively, said second motion-transmitting lever means being bifurcated to define a pair of arm portions (17a, 17b) extending on opposite sides of said first weighing means.

10. Apparatus as defined in claim 8, wherein said second frame includes a first portion (25) extending between said second guide members, and a base portion (24) supporting said first weighing means in collinear alignment with said second load receiving means, said first unit end being remote from said second load receiving means, and further including first flexible bearing means (31) supporting said second motion transmitting means at one end from said frame portion, and second bearing means (29) connecting an intermediate portion of said second motion-transmitting lever with said second load-receiving member, said second motion-transmitting lever means being bifurcated to define a pair of arm portions (30a,30b) arranged on opposite sides of said first weighing means, respectively.

11. Apparatus as defined in claim 2, and further including calibration weight means (23) for applying a calibrating weight force to said first load receiving means independently of said second load receiving means.

* * * * *